(12) United States Patent
Tsai (10) Patent No.: US 6,439,596 B1
(45) Date of Patent: Aug. 27, 2002

(54) COLLAPSIBLE HANDCART

(76) Inventor: James Tsai, No. 103, Ta-Ming 1 Rd., Tan Pao Village, Tan Tzu Hsian, Taichung Hsien (TW)

( * ) Notice: Subject to any disclaimer, the term of this patent is extended or adjusted under 35 U.S.C. 154(b) by 29 days.

(21) Appl. No.: 09/767,678

(22) Filed: Jan. 24, 2001

(51) Int. Cl.[7] ............................. B62B 1/12; A47C 13/00
(52) U.S. Cl. ................... 280/639; 280/40; 280/654; 280/43.24; 297/118; 297/129
(58) Field of Search ...................... 280/639, 40, 37, 280/646, 652, 655, 654, 43.17, 43.21, 43.24, 47.27, 47.29, 47.33, 47.315; 297/118, 129

(56) References Cited

U.S. PATENT DOCUMENTS

| | | | | |
|---|---|---|---|---|
| 3,197,226 A | * | 7/1965 | Erlinder | 280/47.24 |
| 4,754,985 A | * | 7/1988 | Im et al. | 280/47.24 |
| 4,759,559 A | * | 7/1988 | Moulton | 280/47.24 |
| 4,917,392 A | | 4/1990 | Ambasz | |
| 5,072,958 A | * | 12/1991 | Young | 280/40 |
| 5,464,244 A | * | 11/1995 | Tsai | 280/655 |
| 5,468,005 A | * | 11/1995 | Yang | 280/40 |
| 5,778,488 A | * | 7/1998 | Tsai | 280/47.26 |
| 5,803,471 A | * | 9/1998 | DeMars et al. | 280/40 |
| 5,984,327 A | * | 11/1999 | Hsieh et al. | 280/47.24 |
| 6,102,433 A | * | 8/2000 | Stevens | 280/646 |

\* cited by examiner

*Primary Examiner*—Brian L. Johnson
*Assistant Examiner*—Jeffrey J. Restifo
(74) *Attorney, Agent, or Firm*—Browdy and Neimark, P.L.L.C.

(57) ABSTRACT

A collapsible handcart includes a main member equipped with a handgrip; a carrier member pivoted to the main member and turned between an extended position for supporting articles and a collapsed position attached to the main member; two wheeled assembles respectively pivoted two the main member at two sides and turned upwards and downwards between a collapsed position and an operative position, the wheeled assembles each comprising a leg with the proximal end pivoted at the main member, a wheeled carriage pivoted to the distal end of the leg, and a wheel pivoted to the wheeled carriage; and two gear sets respectively coupled between the main member and the legs of the wheeled assembles and adapted to drive the wheeled assembles to turn between the operative position and the collapsed position when turning the carrier member between the extended position and the collapsed position.

11 Claims, 8 Drawing Sheets

COLLAPSIBLE HANDCART

BACKGROUND OF THE INVENTION

The present invention relates to a handcart and, more particularly, to a collapsible handcart with a new way of collapsing the wheels.

Most of the collapsible handcart, in present market, the way and mechanism of collapsing the wheels is like U.S. Pat. No. 4,917,392 disclosed. The wheeled assembles of the collapsible handcart each has a cam slot. When turning the carrier member of the collapsed handcart outwards to the extended position, the wheeled carriages are driven to turn to the extended position in which the axes of rotation of the two wheels are in parallel to the handcart. On the contrary, when the carrier member is turned inwards to the collapsed position, the wheeled carriages are driven to receive in the collapsed position in which the axes of rotation of the two wheels are in orthogonal to the handcart. Such the way of collapsing of the collapsible handcart is boring to the consumers.

SUMMARY OF THE INVENTION

The main object of the present invention is to provide an innovative way of collapsing of a handcart.

According to the object of the present invention, the collapsible handcart comprise a main member equipped with a handgrip; a carrier member pivoted to the main member and turned between an extended position for supporting an article and a collapsed position attached to the main member; two wheeled assemblies respectively pivoted two the main member at two sides and turned upwards and downwards between a collapsed position and an operative position; and two gear sets respectively coupled between the main member and the wheeled assembles to drive the wheeled assembles to turn between the operative position and the collapsed position when turning the carrier member between the extended position and the collapsed position.

DETAILED DESCRIPTION OF THE PREFERRED EMBODIMENT

Figure 1:
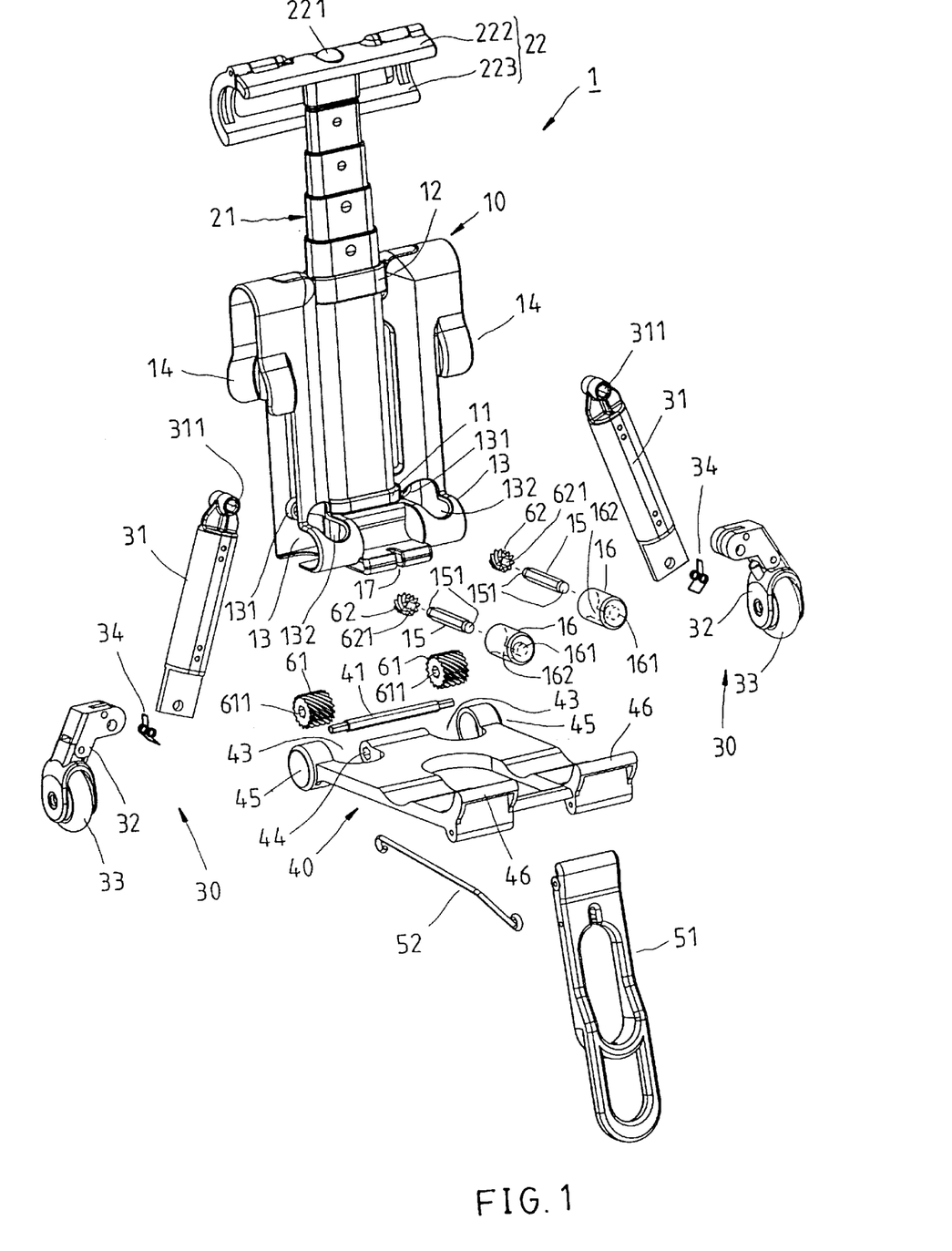
FIG. 1 is an exploded view of a collapsible handcart according to a first embodiment of the present invention.

Referring to FIG. 1, a handcart 1 in accordance with a first embodiment of the present invention is shown comprised of a main member 10, two wheeled assembles 30, a carrier member 40, and two gear sets 60.

The main member 10 comprises a rod seat 11 on the middle near the bottom side thereof, a locating ring 12 on the middle of the top side thereof. Two wheeled seats 14 at two opposite lateral sides of the main member 10, two trigger devices 141 respectively disposed in the wheeled seats 14 at the top (see FIG. 4). Two receptacles 13 bilaterally disposed at the two sides of the bottom end of the main member 10, two pivot slots 131 respectively disposed at the back side of each receptacle 13, two through holes 132 respectively disposed at the front side of each receptacle 13. Two axle caps or holders 16 respectively mounted in the through holes 132, each axle holder 16 comprising a bottom center pivot slot 161 and a peripheral notch 162, and two pivot pins 15 of hexagonal cross-section respectively mounted in the receptacles 13, each pivot pin 15 having two round rods 151 respectively coupled to the pivot slot 131 in one receptacle 13 and the pivot slot 161 of one axle cap 16.

A retractable rod 21 is inserted through the locating ring 12 and fixedly fastened to the rod seat 11, which has a handgrip 22 at the top end, and a control button 221 installed in the top handgrip 22 for unlocking control. After the control button 221 had been depressed, the user can pull the handgrip 22 to move the retractable rod 21 between the extended position and the received position. The handgrip 22 comprises a base frame 222 fixedly fastened to the retractable handle 21, and a handhold frame 223 pivoted to the base frame 22 and held in the downwardly extended initial position by two torsional springs (not shown). When in use, the handhold frame 223 is turned upwards for easy holding with the hand. When released from the hand, the handhold frame 223 is automatically returned to its initial position by the torsional springs.

The wheeled assembles 30 each comprises a leg 31, a wheeled carriage 32, and a wheel 33. The wheel 33 is pivoted to the wheeled carriage 32 for free rotation. The wheeled carriage 32 is pivoted to distal end of the leg 31. The proximal end of the leg 31 has a hexagonal coupling hole 311 coupled to the pivot shaft 15 in one receptacle 13 of the main member 10 for turning with the pivot shaft 15. Each wheeled assemble 30 further comprises two torsional spring 34, with two end against at the respective wheeled carriage 32 and the respective leg 31, and adapted to hold the wheeled carriage 32 in the initial position shown in FIG. 2, as a operative position, enabling the wheeled carriage 32 to be turned to the received position shown in FIGS. 3 and 5.

Figure 2:
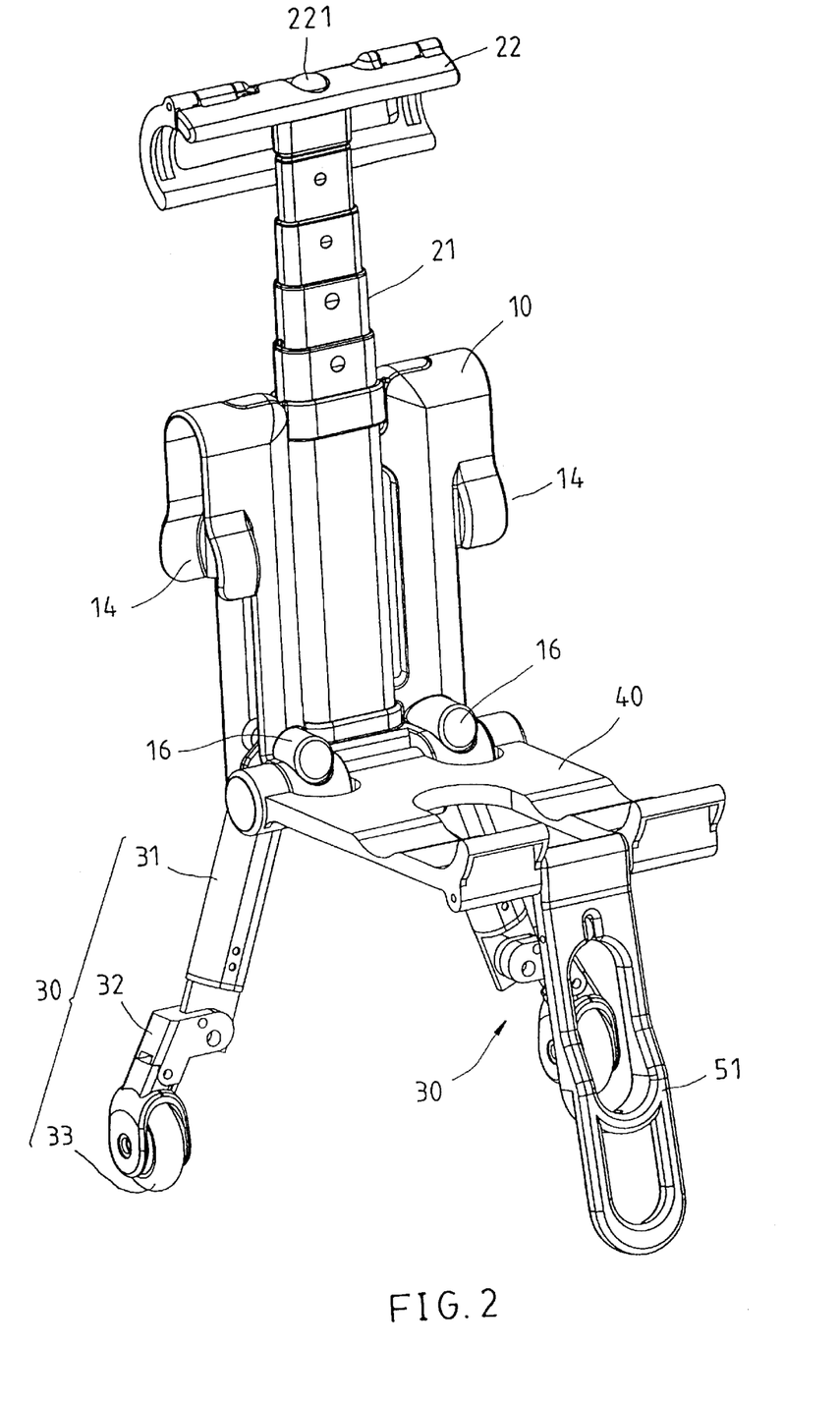
FIG. 2 is a perspective view of the first embodiment of the present invention, showing the collapsible handcart extended out.
Figure 3:
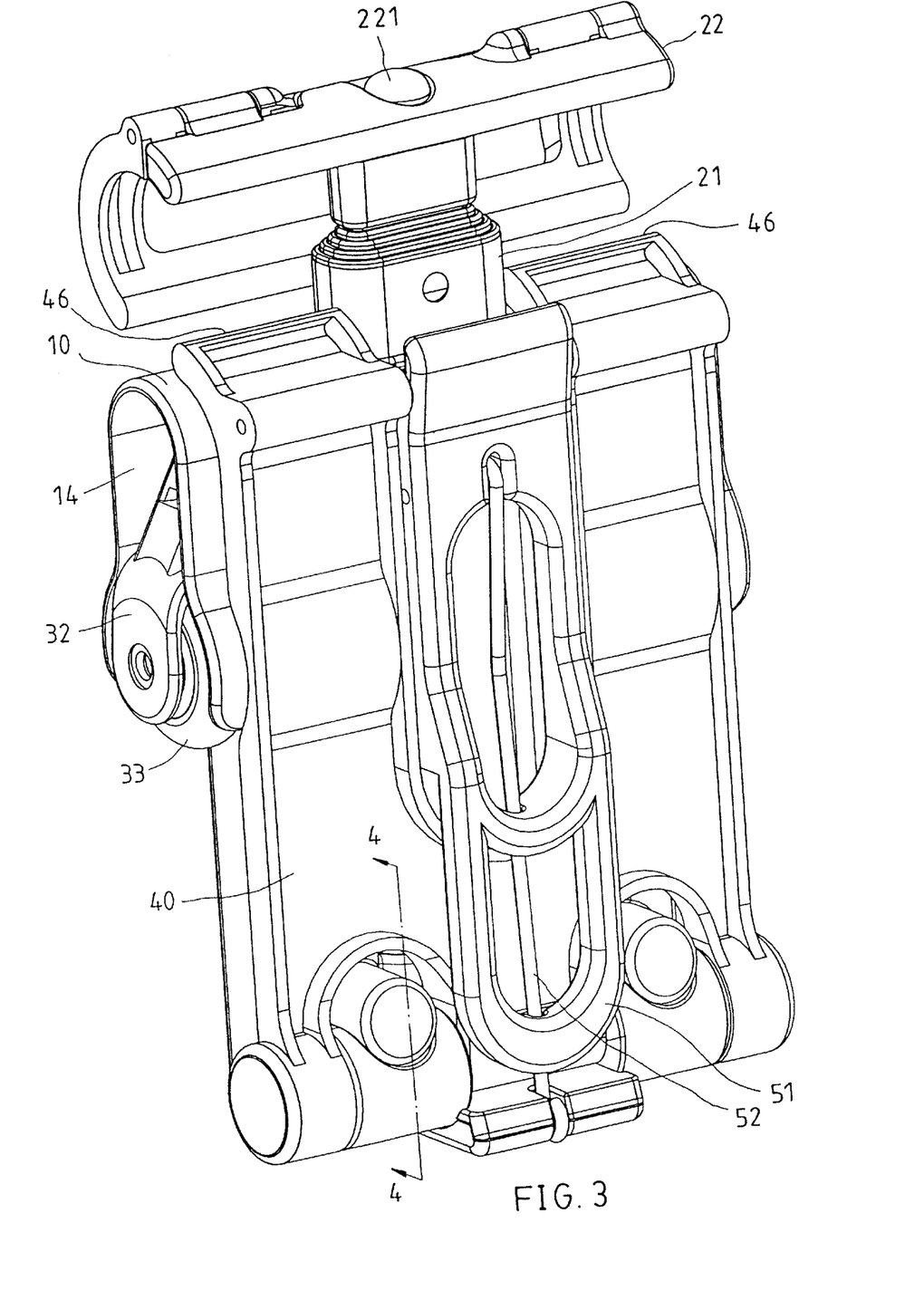
FIG. 3 is a perspective view showing the collapsed status of the collapsible handcart of the first embodiment of the present invention.

The carrier member 40 comprises two caps 45 bilaterally disposed at the rear side thereof and respectively covered on the outer sides of the receptacles 13 of the main member 10, a hexagonal axle hole 44 transversely disposed at the rear side between the caps 45, two gear receptacles 43 respectively disposed at the rear side between two distal ends of the hexagonal axle hole 44 and the caps 45 corresponding to the receptacles 13 of the main member 10, an axle 41 mounted in the hexagonal axle hole 44 to pivotally connect the carrier member 40 to the main member 10 between the receptacles 13 for enabling the carrier member 40 to be turned downwards to the extended position shown in FIG. 2 for supporting an article, or upwards to the collapsed position shown in FIG. 3 where the carrier member 40 is closed attached to the main member 10, and two retaining portions 46 bilaterally disposed at the front side thereof and respectively curved upwards to lock on the top end of the main member 10 for keeping the carrier member 40 at the received position.

A stand 51 is pivoted to the bottom side of the carrier member 40 between the retaining portions 46. The link 52 has one end pivoted to the stand 51, and the other end coupled to a transverse rod (not shown) in a bottom opening 17 of the main member 10. When turning the carrier member 40 downwards to the extended position, the link 52 is forced to push the stand 51 outwards from the carrier member 40 to a particular angle shown in FIG. 2, thus the handcart 1 can stand on a plane with the two wheels 33 and the stand 51. When turning the carrier member 40 upwards to the collapsed position, the link 52 is driven to pull the stand 51 backwards to the collapsed position shown in FIG. 3 where the stand 51 is closely attached to the bottom side of the carrier member 40.

Figure 4:
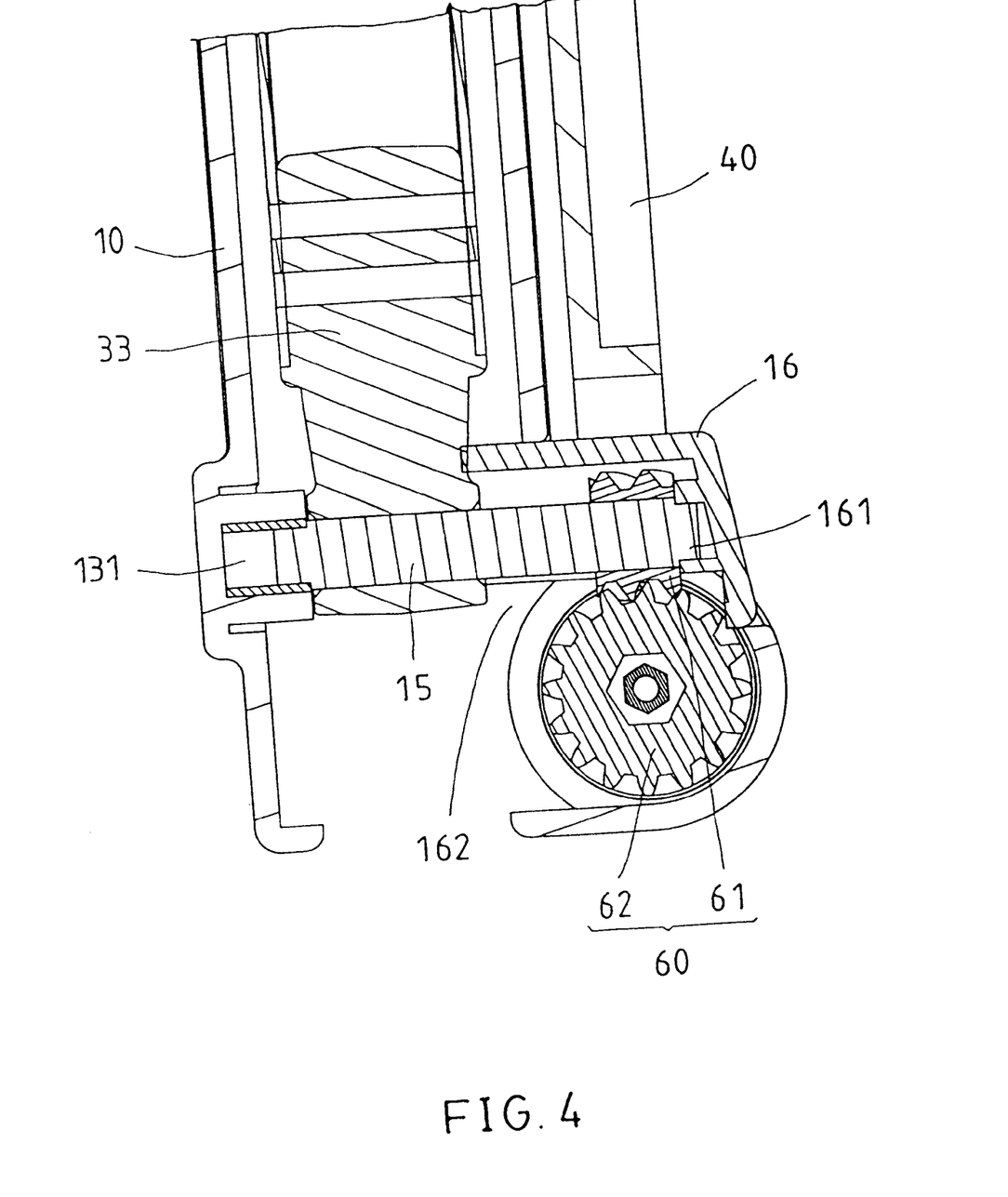
FIG. 4 is a sectional view taken along line 4—4 of FIG. 3.

The gear sets 60 each comprise a first gear 61 and a second gear 62 arranged at right angles. According to the present preferred embodiment, the first gear 61 and the second gear 62 are helical gears engaged together. The first gear 61 is a driving gear. The second gear 62 is a driven gear. The first gears 61 of the gear sets 60 are respectively revolvably mounted on the axle 41 in the gear receptacles 43, each having a hexagonal center through hole 611 coupled to a respective hexagonal axle section 441 of the axle 41. When turning the carrier member 40 relative to the main member 10, the first gears 61 of the gear sets 60 are forced to rotate the second gears 62 of the gear sets 60 respectively. The second gears 62 of the gear sets 60 are respectively mounted on two pivot shafts 15 of the main member 10 as shown in FIG. 4. Therefore, the legs 31, the second gears 62 and the pivot shafts 15 can be rotated together. The first gears 61 and the second gears 62 are respectively engaged together, so that the gear sets 60 are rotated when turning the carrier member 40 relative to the main member 10.

According to the first embodiment of the present invention, the axis of rotation of the carrier member 40 is perpendicular to the axis of rotation of the wheeled assemblies 30, each gear set 60 is comprised of two helical gears 61 and 62 engaged together. Alternatively, bevel gears or worm gears can be used instead of the helical gears to achieve same effect.

Referring to FIG. 2, when turning the carrier member 40 downwards to the extended position as shown in FIG. 2, the legs of the wheeled assemblies are driven by the gear sets to turn downwards at the two opposite sides of the main member 10 to the operative position, the wheeled carriages are hold down at the operative position because of the torsional springs 34, and the link 52 is forced to pull out the stand 51. Thereafter, the handgrip 22 is pulled upwards to extend out the retractable handle 21. FIG. 2 shows the handcart 1 extended out.

Figure 6:
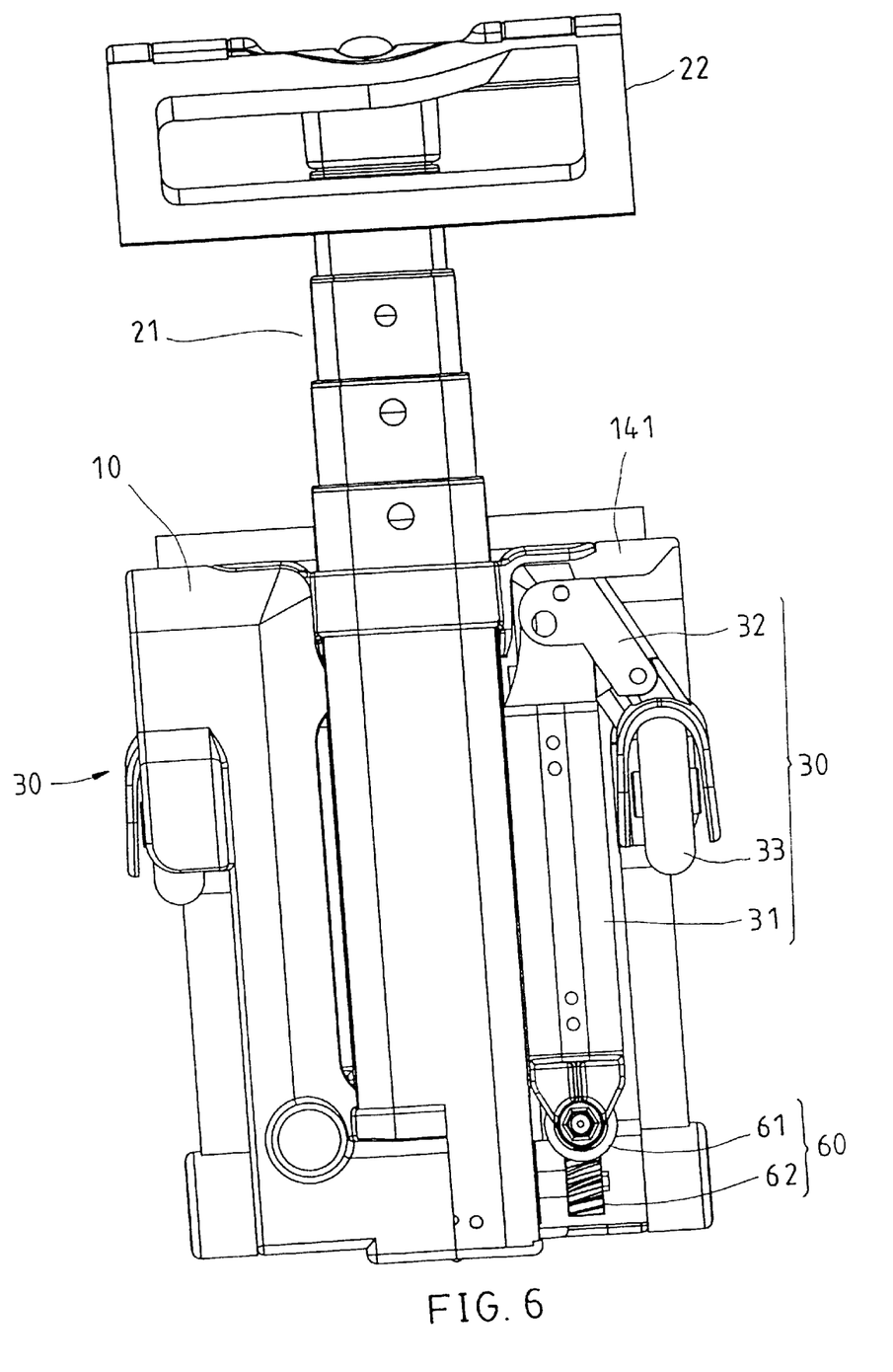
FIG. 6 illustrates the receiving of the wheeled assembles of the collapsible handcart of the first embodiment of the present invention (II).

When not in use, as shown in FIG. 3, the carrier member 40 is turned upwards to the collapsed position. At this time, the wheeled assemblies 30 are driven by the two gear sets 60 to be turned upwards to the collapsed position and received in the wheeled seats 14 of the main member 10 as shown in FIG. 6, and the link 52 is forced to pull back the stand 51. When received, the retractable handle 21 is set back into the received position.

Figure 5:
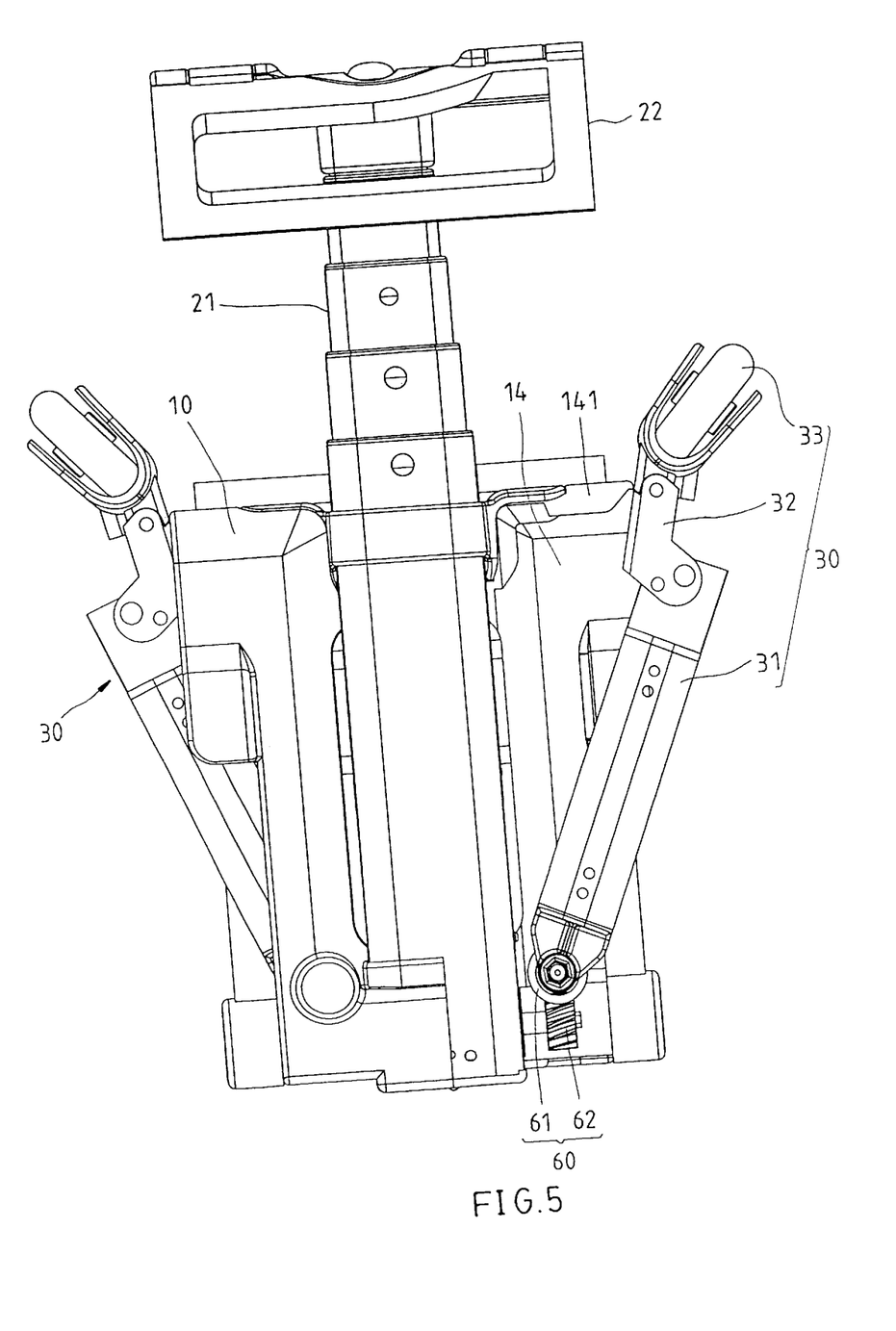
FIG. 5 illustrates the receiving of the wheeled assembles of the collapsible handcart of the first embodiment of the present invention.

Referring to FIGS. 5 and 6, before the wheeled assemblies 30 are totally received in the wheel seat 14 of the main member 10, the wheeled carriages 32 are pressed by the trigger device 141 first, and the wheeled carriages 32 are turned to the received position. Finally, accomplishing the collapsed status as shown in FIG. 6. When turning the carrier member 60 to the extended position, the wheeled carriages 32 are moved apart from the trigger devices 141, and then forced outwards to the operative position by the springs 34.

Figure 7:
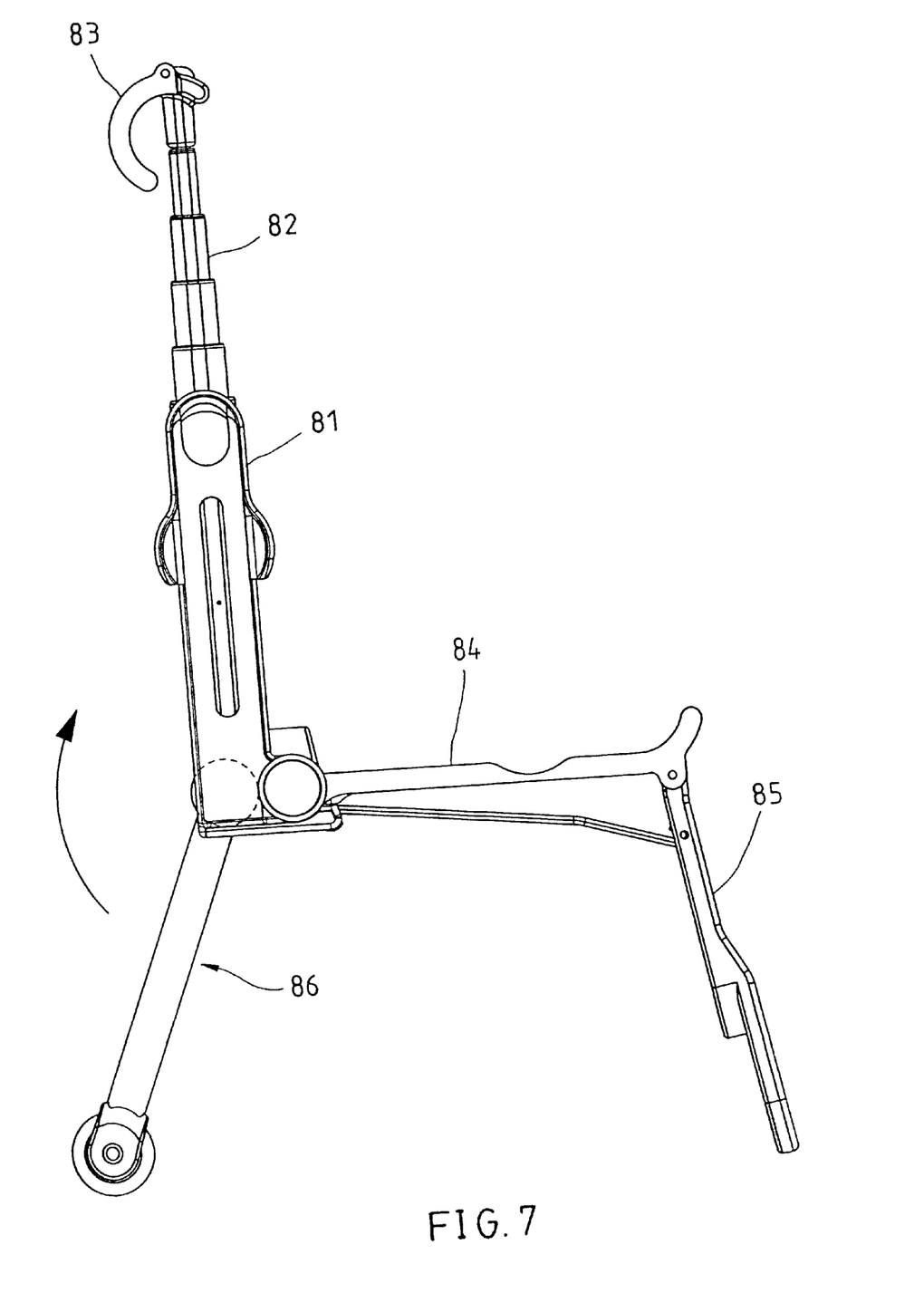
FIG. 7 is a perspective view of a collapsible handcart according to a second embodiment of the present invention when extended out.
Figure 8:
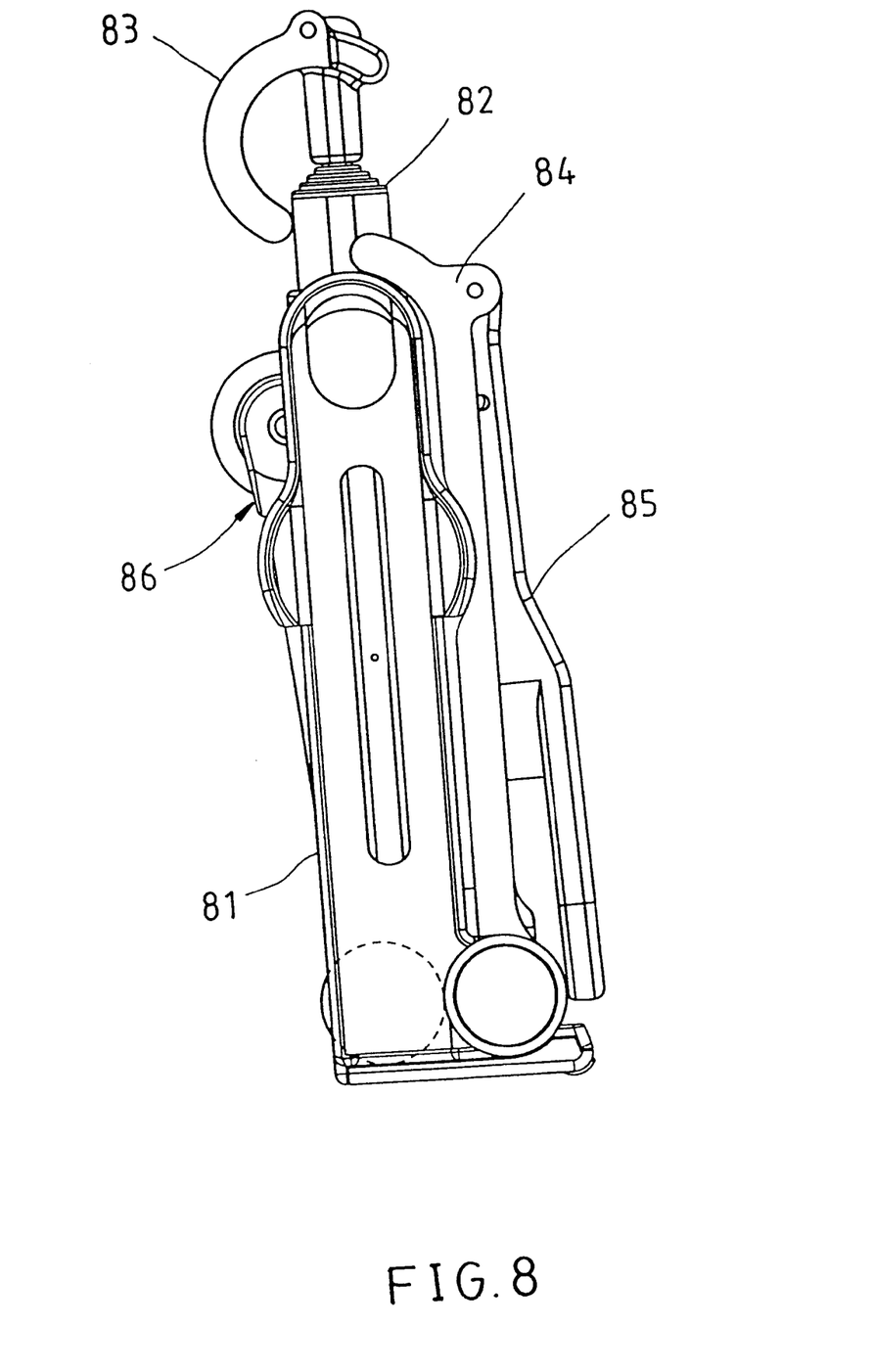
FIG. 8 is a perspective view showing the collapsed status of the collapsible handcart of the second embodiment of the present invention.

FIGS. 7 and 8 show a collapsible handcart 2 according to a second embodiment of the present invention. According to this alternate form, the collapsible handcart is comprised of a main member 81, a retractable rod 82 with a handgrip 83, a carrier member 84, a stand 85, two wheeled assembles 86, two first gears and two second gears (not shown). The wheeled assembles 86 obliquely downwardly extended from the backside of the main member 81. The first gears and the second gears are spur gears respectively engaged together. When turning the carrier member 84 downwards to the extended position, the wheeled assembles 86 are turned downwards to the operative position shown in FIG. 7. On the contrary, when turning the carrier member 84 upwards to the collapsed position, the wheeled assembles 86 are turned upwards to the collapsed position shown in FIG. 8.

As indicated above, the wheeled assembles support the carrier member at a certain elevation so that the user can conveniently pick up things from the carrier member without bending the body.

It is to be understood that the drawings are designed for purposes of illustration only, and are not intended for use as a definition of the limits and scope of the invention disclosed.

What the invention claimed is:

1. A collapsible handcart comprising:
   a main member has a handgrip;
   a carrier member, with one end pivoted to the bottom side of said main member for turning said carrier member between a extended position in which said carrier member is turned downwards a predetermined angle for supporting an article, and a collapsed position in which said carrier member is turned upwards to attach to said main member;
   two wheeled assembles, each of which comprises a leg, a wheeled carriage and a wheel, wherein said wheel is pivoted on said wheeled carriage and said wheeled carriage is provided on the distal end of said leg; said legs of said wheeled assemblies with the proximal ends pivoted at said main member, whereby said two wheeled assemblies can be turned upwards to a collapsed position, in which said wheeled assemblies are attached to said main member; and said wheeled assemblies can be turned downward to exceed 90 degrees to an operative position;
   two gear sets respectively coupled between said main member and the legs of said wheeled assembles for driving said wheeled assembles to turn between the operative position and the collapsed position when turning said carrier member between the extended position and the collapsed position.

2. The collapsible handcart of claim 1, wherein said wheeled carriages of said wheeled assemblies are pivoted to the distal ends of said legs of said wheeled assemblies respectively, and turned outwards and inwards relative to the legs between an operative position and a received position, and said main member comprises two trigger devices adapted to press said wheeled carriages of said wheeled assembles to turn to the received positions when wheeled assembles are turned to the collapsed position.

3. The collapsible handcart of claim 2, wherein each of said wheeled assemble further comprise a spring, which with two ends against at the respective leg and the respective wheeled carriage and adapted to hold the respective wheeled carriage in the operative position.

4. The collapsible handcart of claim 1, wherein said wheeled assembles are respectively pivoted to two opposite lateral sides of said main member, and turned downwards to the extended position or upwards to the received position.

5. The collapsible handcart of claim 1, wherein said wheeled assembles are respectively pivoted to a back side of said main member, and turned downwards to the extended position or upwards to the received position.

6. The collapsible handcart of claim 1, wherein said main member comprises two wheeled seats for receiving said wheeled assemblies when said wheeled assemblies are turned to the collapsed positions.

7. The collapsible handcart of claim 1, which further comprises a retractable rod provided at said main member, said handgrip is provided at the top end of said retractable rod.

8. The collapsible handcart of claim 7, wherein said handle assembly further comprises a control button installed in said handgrip and adapted to control operation of said retractable rod.

9. The collapsible handcart of claim 1 further comprises a stand pivoted to the bottom side of said carrier member, and turned relative to said carrier member between an extended position and a received position.

10. The collapsible handcart of claim 9 further comprises a link coupled between said stand and said main member, and adapted to pull said stand to the received position when said carrier member is turned upwards to the collapsed position and to push said stand to the extended position when said carrier member is turned downwards to the extended position.

11. The collapsible handcart of claim 1, wherein said carrier member comprises two lock portions and adapted for securing to a part of said main member when said carrier member is turned upwards to the collapsed position.

* * * * *